United States Patent [19]
Cohen

[11] 3,799,299

[45] Mar. 26, 1974

[54] DAMPING DASHPOT ASSEMBLY

[75] Inventor: Arthur M. Cohen, Westport, Conn.

[73] Assignee: Airpot Corporation, Norwalk, Conn.

[22] Filed: Nov. 6, 1972

[21] Appl. No.: 303,776

[52] U.S. Cl............... 188/282, 137/525.3, 188/301, 188/322
[51] Int. Cl.............................................. F16f 9/34
[58] Field of Search .......... 188/282, 301, 317, 322; 137/525.3, 525.5, 525.7, 527.6, 527.8, 527

[56] References Cited
UNITED STATES PATENTS

| | | | |
|---|---|---|---|
| 83,848 | 11/1868 | Hamilton | 137/525.3 |
| 2,212,259 | 8/1940 | Binder | 188/317 X |
| 2,516,172 | 7/1950 | Baldwin | 188/317 X |
| 3,005,523 | 10/1961 | May | 188/322 X |
| 3,128,785 | 4/1964 | Krummel | 137/525.3 X |
| 3,584,712 | 6/1971 | Dickinson | 188/282 |

*Primary Examiner*—George E. A. Halvosa

[57] ABSTRACT

A piston-connecting rod assembly for use in damping dash-pot cylinders. The connecting rod in the assembly has a fluid passage extending therethrough and a sleeve member mounted on the rod with a movable flap which overlies and covers the passage. The movement of the flap between open and closed positions is responsive to the fluid flow induced by the movement of the piston in the cylinder, the closed position corresponding to an operative damping position and the open position corresponding to an inoperative position. The sleeve aids in securing the piston to the connecting rod without any play therebetween.

12 Claims, 3 Drawing Figures

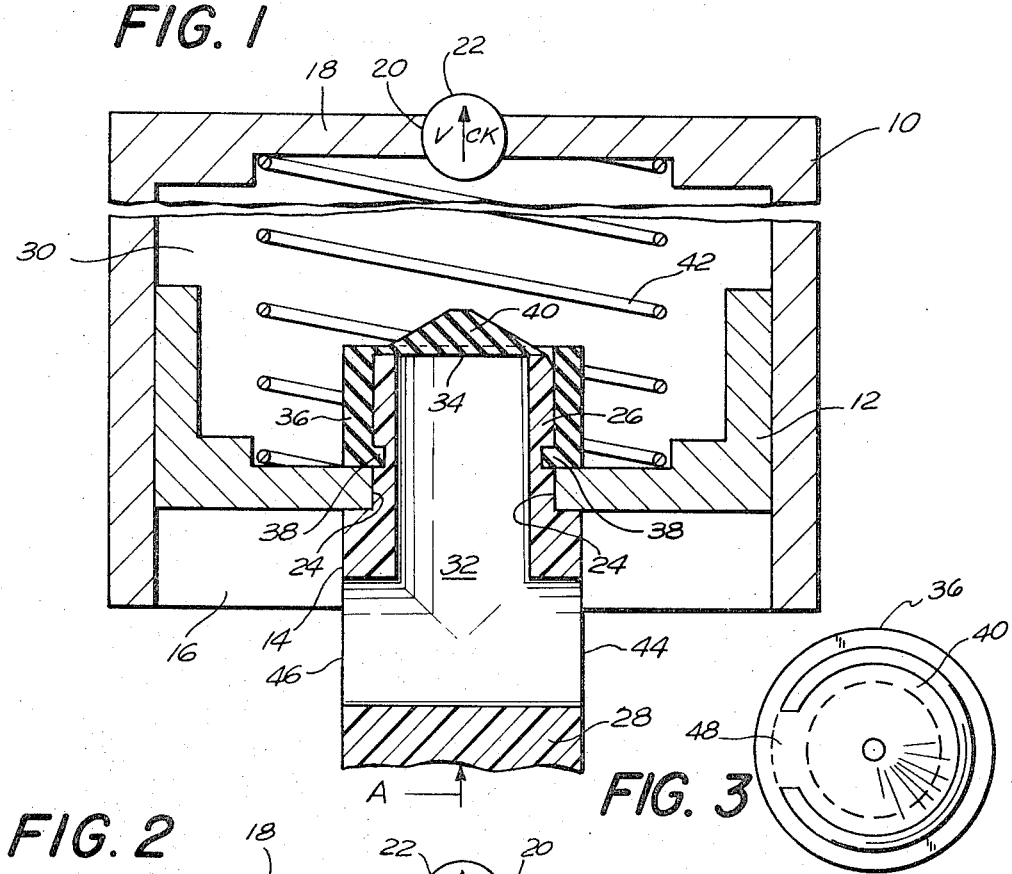
FIG. 1
FIG. 3
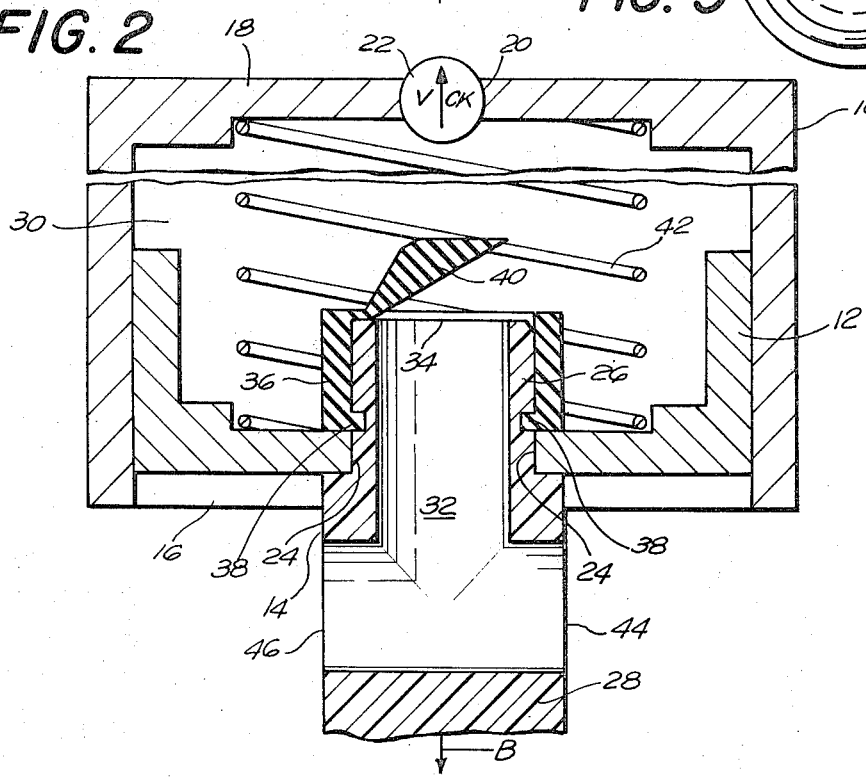
FIG. 2

DAMPING DASHPOT ASSEMBLY

This invention relates to the construction of a piston-connecting rod assembly for use in damping dashpot cylinders.

The use of damping dashpots is widespread. Such devices are employed for damping or snubbing the movement of large structural elements such as doors and windows, as well as for damping the movement of smaller elements which are frequently used in metering and control devices. In either instance, it is required that precise and reliable damping control be achieved.

Dashpots generally comprise a cylinder within which a piston is slidable, the dashpot action being provided by the compression or expansion of the air in the chamber defined between the piston and the cylinder and the flow of air out from or into the chamber. A valve is provided to control that flow of air. In order for the dashpot action to be effective and to be accurately controllable, it is essential that the piston fit into the cylinder in an air-tight fashion while still being slidable therethrough. Controlled damping action also requires that there be no free movement within the dashpot assembly, such free movement arising from play which may be present between the component parts and which may be derived from lack of precision in manufacture or from shock encountered during the snubbing operation. Furthermore, it is desirable that the dashpot assembly comprise a simple and compact construction in order that it take up a minimum amount of space when positioned for damping.

The prime object of this invention is to devise a dashpot assembly in which precise and reliable damping control is achieved.

Another object of the invention is to construct a piston-connecting rod assembly which houses in-situ the valve means instrumental to the damping operation.

A further object is to provide a piston-connecting rod assembly which is resistant to the development of play between the component parts thereof.

Still a further object is to provide a sleeve member for the piston-connecting rod assembly which has the dual function of providing the valve means for the damping operation and providing the means for eliminating any play between the piston and the connecting rod.

Various other objects and advantages of the invention will be apparent from a reading of the disclosure that follows.

In accordance with the present invention, a novel piston-connecting rod assembly is provided wherein the connecting rod has an aperture therethrough and a sleeve member mounted thereon, the sleeve member having a movable flap which overlies and covers the aperture in the connecting rod. The movement of the piston into and out of a damping dashpot cylinder controls the opening and closing of the flap to provide the appropriate damping control. Thus, the flap will assume a closed damping position when the piston is moved into the cylinder, the closed position resulting from the pressure exerted on the flap by the compressed air in the cylinder. On the other hand, the flap will assume an open position when the piston is withdrawn from the cylinder due to the influx of air through the aperture in the rod to alleviate the reduced air pressure conditions in the cylinder.

The sleeve member is also utilized to resiliently secure the piston to the connecting rod in order that an air-tight, permanent seal is maintained therebetween and that the resulting assembly is resistant to the formation of any play between these component parts. The resilient engagement provided by the sleeve member also compensates for any lack of precision in the manufacture of the piston and the rod. It is thus seen that an efficient and reliable damping dashpot assembly is produced wherein the component parts can be inexpensively formed and the assembly of these parts is desirably simple and compact.

To the accomplishment of the above, and to such other objects as may hereinafter appear, the present invention relates to the construction of a dashpot assembly as defined in the appended claims and as described in the specification, together with the accompanying drawings in which:

FIG. 1 is a cross-sectional view of the dashpot assembly of this invention depicting the positioning of the component parts as the piston is being moved into the cylinder;

FIG. 2 is a cross-sectional view of the dashpot assembly depicting the positioning of the component parts as the piston is withdrawn from the cylinder; and FIG. 3 is a top plan view of the sleeve member and the movable flap secured thereto.

The embodiment of the dashpot assembly of the present invention, as herein disclosed, comprises a cylinder 10, the internal diameter of which is accurately dimensioned, within which a piston 12 is slidable in sealing relation to the inner surface thereof. Cylinder 10 exhibits a closed end 18 and an aperture 20 extending through a wall thereof, preferably closed end wall 18, which houses valve means 22 for providing single direction fluid-flowout of the chamber 30 defined by cylinder 10 and piston 12. Cylinder 10 is preferably formed of glass, the inner surface of which is accurately dimensioned to fit the outer dimension of piston 12.

Piston 12 is provided with a generally centrally located opening for operatively engaging connecting rod 14. It should be noted that piston 12 and rod 14 may be formed of any appropriate material. For example, compressed powdered graphite may be used to form piston 12. Rod 14 may be formed to shape by means of molded plastics, the use of such plastics substantially reducing the difficulty and high cost that might otherwise be anticipated in preparing connecting rod 14.

Connecting rod 14 extends from piston 12 through the open end 16 of cylinder 10 and is adapted to be connected in any appropriate manner with the element or elements whose movement is to be damped. Rod 14 is provided with means for receiving and operatively engaging piston 12. The preferred manner for receiving piston 12 is by means of recess 24 located on the periphery of connecting rod 14 with piston 12 being adapted to securely fit into recess 24. It should be noted that recess 24 may simply comprise a ledge or shoulder with piston 12 being adapted to rest thereon. Other means for receiving piston 12 will be obvious to the practitioner, it merely being required that a permanent air-tight connection be effected. Recess 24 also serves to divide connecting rod 14 into an upper section 26 and a lower section 28. The upper section 26 projects beyond the upper surface of piston 12 and extends into chamber 30 defined by piston 12 and cylinder 10. The lower section 28 of connecting rod 14 is that portion thereof which extends below piston 12 into the open end 16 of cylinder 10. Furthermore, in order to facilitate the subsequent engagement of piston 12 to rod 14, the diameter of recess 24 will generally be equal to the diameter of upper section 26. In this manner, sleeve member 36 can readily engage and secure piston 12 to rod 14.

Connecting rod 14 has an interior aperture 32 extending between upper section 26 and lower section 28. Aperture 32 has one end 34 which is located in upper section 26 and at least one end, and preferably a plurality of ends 44, 46 which exit in lower section 28. Accordingly, aperture 32 defines a fluid passage which connects interior chamber 30 of cylinder 10 with the ambient exterior thereof.

Sleeve member 36, which is mounted on the upper section 26 of connecting rod 14, is generally formed of a suitable soft plastic material, preferably strechable and elastomeric in nature. Natural or synthetic rubber is especially suitable for use in that connection. Sleeve member 36 fits over the upper section 26 of connecting rod 14 so that it stretches over and grips the outer surface thereof. Sleeve member 36 has a projection 38 which extends into recessed area 24 where piston 12 engages connecting rod 14. The sleeve projection 28 is thus interposed between the upper surface of piston 12 and the underneath side of recess 24 so that piston 12 is resiliently pressed against recess 24. The extension of sleeve member 36 into this area has the effect of (1) holding the piston and the connecting rod together; (2) resiliently securing the two component parts in fixed position without play, thereby compensating for any lack of precision in the dimensions of the parts and substantially eliminating the possibility of free movement within the controlled device and the disruption in damping which may result from such free movement; and (3) substantially eliminating the possibility of dislodging the connection between the two parts, thereby ensuring that the required air-tight fitting is maintained inviolate.

Sleeve member 36 also has a flap 40 secured thereto which in normal position overlies and covers the end 34 of aperture 32 which is located in upper section 26 of connecting rod 14. As depicted in FIG. 3, flap 40 will generally be formed as an integral part of sleeve member 36. Thus, sleeve member 36 and flap 40 form a uniform continuous assembly with flap 40 being formed in-situ by separating the top of sleeve member 36 around a substantial portion of its circumference. The uncut section 48, i.e., the hinge, should be of sufficient length to permit the unhampered opening and clsong of flap 40 in response to the fluid flow. The use of an elastomeric material in preparing sleeve member 36 ensures that a substantially "permanent" hinge is formed, i.e., one that will not split under the pressure of prolonged and repeated flexing. While it is desirable that flap 40 be formed as an integral part of sleeve member 36, it should be noted that any operable extraneous hinge attachment, such as a spring wire construction, may be utilized as a substitute for the integral connection.

Flap 40 is movable in order that aperture 32 may be opened to and sealed from the interior of cylinder 10. Thus, flap 40 is movable between an operative position (see FIG. 1) covering and closing aperture 32 and an inoperative position (see FIG. 2) exposing aperture 32. The orientation of flap 40 relative to aperture 32 is such that it assumes one or the other of its designated positions depending upon the direction of movement of piston 12.

The manner in which the dashpot assembly operates can be readily ascertained from a comparison of FIG. 1 and FIG. 2. In FIG. 1, piston 12 is depicted as having been moved in a direction toward the closed end 18 of cylinder 10, as indicated by arrow A. This inward movement of piston 12 compresses the air in chamber 30, the increased air pressure thereby pressing against flap 40 so as to place it in a closed position. The closed position prevents the escape of air from chamber 30 via aperture 32 which, if permitted to occur, would nullify the damping operation. Therefore, the exiting of the air from chamber 30, which is necessitated by the inward movement of piston 12, is effected through check valve 22 in cylinder aperture 20. This slow escape of the air from chamber 30 permits the inward movement of piston 12 but at a reduced rate of speed. Accordingly, the inward movement of piston 12 is damped, which in turn is translated to a damping of the movement of the element connected to rod 14. Upon withdrawing piston 12, as indicated by arrow B in FIG. 2, a reduction in air pressure occurs in chamber 30 which is necessarily equalized by the introduction of air from outside chamber 30. Since check valve 22 does not permit the flow of air into chamber 30, the only passage available for the entry of air is defined by openings 44, 46, aperture 32 and opening 34. The flow of air through aperture 32 thus lifts flap 40 into an open position so as to enable the air to pass freely into chamber 30.

Withdrawal of the piston 12 may be effected by the reciprocating movement of the element or elements that are connected to connecting rod 14. On the other hand, where such return movement is not available, return means 42 is positioned in chamber 30 between piston 12 and the closed end 18 of cylinder 10. Accordingly, when piston 12 is fully inserted in cylinder 10 (FIG. 1), the return means 42 will serve to return piston 12 to its original position relative to cylinder 10, whereupon it may once again be moved into chamber 30 to initiate the damping cycle. A variety of return means may be utilized in the assembly although compression springs (shown in FIGS. 1 and 2) and other similar spring assemblies are generally preferred for this purpose.

It is noteworthy that with the construction disclosed herein, only the interior of cylinder 10 and the exterior of piston 12 need be made to precise tolerances. The remaining component parts can be prepared with great latitude of dimension while still providing precise and reliable damping control, this permissible lack of precision in the dimensions being substantially compensated for by the presence of the sleeve member. The simplicity of the construction, as well as its substantial resistance to the possible adverse effects of the snubbing operation, further emphasize the improved nature of the damping dashpot assembly of this invention.

While but a limited number of embodiments of the present invention have been here specifically disclosed, it will be apparent that many variations may be made therein, all within the scope of the invention as defined in the following claims:

I claim:

1. A piston-connecting rod assembly for use in a damping dashpot cylinder with an aperture therethrough and valve means in said aperture for providing single direction fluid flow out of said cylinder;

said assembly comprising a piston and a connecting rod operatively connected thereto;

said connecting rod having a recess on the periphery thereof and a ledge on which said piston rests, said ledge dividing said connecting rod into upper and lower sections; a fluid passage aperture extending through said rod between said upper and lower sections; and a resilient sleeve member mounted on said upper section, said sleeve member having a projection fitting into said recess and resiliently urging said piston against said ledge to operatively connect said piston and said connecting rod and to minimize play therebetween, and a flap secured to said sleeve movable in response to pressure variations within said cylinder between a first position overlying and covering the opening of said fluid passage located in the upper section of said rod and a second position uncovering said opening.

2. A damping dashpot assembly comprising a damping dashpot cylinder with an aperture therethrough and valve means in said aperture for providing single direction fluid flow out of said cylinder;

a piston-connecting rod subassembly comprising a piston and a connecting rod operatively connected thereto;

said connecting rod having receiving means for receiving said piston, said receiving means dividing said connecting rod into upper and lower sections; a fluid passage aperture extending through said rod between said upper and lower sections; and a sleeve member mounted on said upper section, said sleeve member having a movable flap secured thereto normally overlying and covering the opening of said fluid passage located in the upper section of said rod and movable to a position uncovering said opening, said sleeve providing means to secure the piston to the rod.

3. The assembly of claim 2, wherein said sleeve member is resilient.

4. The assembly of claim 2, wherein said movable flap is an integral part of said sleeve member.

5. The assembly of claim 2, wherein said connecting rod comprises a molded plastic construction.

6. The assembly of claim 2, wherein return means are positioned on the upper surface of said piston.

7. The assembly of claim 6, wherein said return means is a compression spring.

8. The assembly of claim 2, wherein said sleeve member is received in said receiving means and there engages both said piston and said connecting rod.

9. The assembly of claim 8, wherein said connecting rod has a recess on the periphery thereof and said sleeve member has a projection fitting into said recess to secure said piston to said connecting rod.

10. The assembly of claim 8, wherein said receiving means comprises a ledge on which said piston rests, said sleeve member engaging said piston on the surface opposite to said ledge and thereby urges said piston against said ledge.

11. The assembly of claim 8, wherein said sleeve member is resilient.

12. The assembly of claim 11, wherein said piston is resiliently secured to said connecting rod.

* * * * *